United States Patent
Wu et al.

(10) Patent No.: US 9,706,169 B2
(45) Date of Patent: Jul. 11, 2017

(54) REMOTE CONFERENCE SYSTEM AND METHOD OF PERFORMING REMOTE CONFERENCE

(71) Applicant: BOE Technology Group Co., Ltd., Beijing (CN)

(72) Inventors: Naifu Wu, Beijing (CN); Bei Niu, Beijing (CN); Wei Wei, Beijing (CN); Kun Wu, Beijing (CN); Tao Wang, Beijing (CN); Chia-Chiang Lin, Beijing (CN); Chunmiao Zhou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/912,686

(22) PCT Filed: Jun. 9, 2015

(86) PCT No.: PCT/CN2015/081041
§ 371 (c)(1),
(2) Date: Feb. 18, 2016

(87) PCT Pub. No.: WO2016/110047
PCT Pub. Date: Jul. 14, 2016

(65) Prior Publication Data
US 2016/0353059 A1    Dec. 1, 2016

(30) Foreign Application Priority Data
Jan. 9, 2015    (CN) .......................... 2015 1 0013171

(51) Int. Cl.
*H04N 7/15*    (2006.01)
*G06F 3/01*    (2006.01)
(Continued)

(52) U.S. Cl.
CPC ............... *H04N 7/15* (2013.01); *G06F 3/012* (2013.01); *G06F 3/013* (2013.01); *G10L 17/005* (2013.01);
(Continued)

(58) Field of Classification Search
CPC  H04N 7/15; H04N 7/152; H04N 7/14; H04N 7/147; H04N 7/144
(Continued)

(56) References Cited

U.S. PATENT DOCUMENTS 8,560,315 B2 * 10/2013 Yasoshima .......... H04L 12/1827
704/231
9,386,270 B2 *  7/2016 Griffin ................ H04L 12/1822
(Continued)

FOREIGN PATENT DOCUMENTS

CN        1732687 A      2/2006
CN      101764990 A      6/2010
(Continued)

OTHER PUBLICATIONS

International Search Report and Written Opinion for International Patent Application No. PCT/CN2015/081041, dated Oct. 13, 2015, 8 pages.
(Continued)

*Primary Examiner* — Melur Ramakrishnaiah
(74) *Attorney, Agent, or Firm* — Westman, Champlin & Koehler, P.A.

(57) ABSTRACT

The embodiments of the present invention disclose a remote conference system and a method of performing the remote conference. The remote conference system includes a first image-displaying system, at a first conference location, configured to display images of a plurality of audiences; a detection system configured to detect motions or poses of at least part of heads of persons in the first conference location; a judgment system configured to judge whether a person who is talking is talking to a certain audience or some certain
(Continued)

audiences of the plurality of audiences or is talking to all the audiences based on the motions or poses detected by the detection system; a second image-displaying system, at a second conference location, configured to display special images to the certain audience or some the audiences of the plurality of audiences when the judgment system has judged that the person who is talking is talking to the certain audience or some certain audiences of the plurality of audiences, such that the certain audience or some of the plurality of audiences is/are aware that the person who is talking is talking to him or them. Whereby, target audience(s) in the remote conference may know the person who is talking is talking to him or them.

20 Claims, 2 Drawing Sheets (51) Int. Cl.
*G10L 17/00* (2013.01)
*H04N 7/14* (2006.01)
*G10L 25/57* (2013.01)
*G10L 25/78* (2013.01)

(52) U.S. Cl.
CPC .............. *G10L 25/57* (2013.01); *H04N 7/142* (2013.01); *G10L 25/78* (2013.01)

(58) Field of Classification Search
USPC .......................................... 348/14.01–14.16
See application file for complete search history.

(56) References Cited

U.S. PATENT DOCUMENTS

| 2004/0130614 | A1 | 7/2004 | Valliath et al. |
| 2008/0298571 | A1 | 12/2008 | Kurtz et al. |
| 2010/0250252 | A1 | 9/2010 | Yasohima |
| 2013/0120522 | A1* | 5/2013 | Lian .......................... H04N 7/15 348/14.08 |
| 2013/0188007 | A1* | 7/2013 | Duong ..................... H04N 7/15 348/14.08 |
| 2013/0215214 | A1* | 8/2013 | Dhopte .................. H04N 7/157 348/14.08 |

FOREIGN PATENT DOCUMENTS

| CN | 102025970 A | 4/2011 |
| CN | 102377975 A | 3/2012 |
| CN | 104539873 A | 4/2015 |
| WO | 2007/005752 A2 | 1/2007 |

OTHER PUBLICATIONS

English translation of Box No. V from the Written Opinion of the International Search Report for International Patent Application No. PCT/CN2015/081041, 2 pages.
First Office Action, including Search Report, for Chinese Patent Application No. 201510013171.2, dated Mar. 30, 2017, 9 pages.

* cited by examiner

REMOTE CONFERENCE SYSTEM AND METHOD OF PERFORMING REMOTE CONFERENCE

CROSS-REFERENCE TO RELATED APPLICATIONS

This application is a Section 371 National Stage Application of International Application No. PCT/CN2015/081041, filed Jun. 9, 2015, entitled "Remote Conference System and Method of Performing Remote Conference", which claims priority to Chinese Application No. 201510013171.2, filed on Jan. 9, 2015, incorporated herein by reference in their entirety.

BACKGROUND

1. Technical Field

Embodiments of the present invention relate to a remote conference system and a method of performing the remote conference.

2. Description of the Related Art

Internet-based remote conference is becoming an option for common businesses. However, an audience in a remote conference can never know whether a person who is talking is talking to him or not.

SUMMARY

It is an object of embodiments of the present invention to provide a remote conference system and a method of performing a remote conference, thereby an audience in a remote conference can know whether a person who is talking is talking to him or not.

According to an embodiment of the present invention, there is provided a remote conference system, comprising: a first image-displaying system at a first conference location, configured to display images of a plurality of audiences; a detection system configured to detect motions or poses of at least part of heads of persons in the first conference location; a judgment system configured to judge whether a person who is talking is talking to a certain audience or some certain audiences of the plurality of audiences or to all the audiences based on the motions or poses detected by the detection system; a second image-displaying system, at a second conference location, configured to display special images to the certain audience or some certain audiences of the plurality of audiences when the judgment system has judged that the person who is talking is talking to the certain audience or some certain audiences of the plurality of audiences, such that the certain audience or some certain audiences of the plurality of audiences is/are aware that the person who is talking is talking to him or them.

According to an embodiment of the present invention, the remote conference system further comprise a voice tracking system, at the first conference location, configured to determine which person from the persons in the first conference location is talking.

According to an embodiment of the present invention, the second image-displaying system is further configured to display common images to all the audiences when the judgment system had judged that the person who is talking is talking to all the audiences.

According to an embodiment of the present invention, the second image-displaying system is further configured to display the common images to the rest of the audiences while displaying the special images to the certain audience or some certain audiences of the plurality of audiences.

According to an embodiment of the present invention, in addition to the person who is talking to the certain audience or some certain audiences of the plurality of audiences, other person(s) is/are further included in the first conference location, and the special images only include images of the person who is talking to the certain audience or some certain audiences of the plurality of audiences or only include images of face of the person who is talking to the certain audience or some certain audiences of the plurality of audiences.

According to an embodiment of the present invention, in addition to the person who is talking to the certain audience or some certain audiences of the plurality of audiences, other person(s) is/are further included in the first conference location, and the special images may only include images of the person who is talking to the certain audience or some certain audiences of the plurality of audiences or may only include images of face of the person who is talking to the certain audience or some certain audiences of the plurality of audiences while the common images include images of the person who is talking and at least one of other person(s), or images of faces of the person who is talking and at least one of other person(s).

According to an embodiment of the present invention, in addition to the images of the person who is talking to the certain audience or some certain audiences of the plurality of audiences, the common images include more images of scene than the special images.

According to an embodiment of the present invention, the images of the person who is talking to the certain audience or some certain audiences of the plurality of audiences have a larger size in the special images than in the common images.

According to an embodiment of the present invention, the images of the face of the person who is talking to the certain audience or some certain audiences of the plurality of audiences have a larger size in the special images than in the common images.

According to an embodiment of the present invention, the detection system is an eyeball tracking system configured to detect motions of eyeballs of persons in the first conference location, and the judgment system judges whether the person who is talking is talking to the certain audience or some certain audiences of the plurality of audiences, or is talking to all the audiences, based on the motions of eyeballs detected by the eyeball tracking system.

According to an embodiment of the present invention, there is provided a method of performing a remote conference, comprising: displaying images of a plurality of audiences by means of a first image-displaying system at a first conference location; detecting, by means of a detection system, motions or poses of at least part of heads of persons in the first conference location; judging, by means of a judgment system, whether a person who is talking is directed to a certain audience or some certain audiences of the plurality of audiences or is directed to all the audiences based on the motions or poses detected by the detection system; displaying, by means of a second image-displaying system at a second conference location, special images to the certain audience or some certain audiences of the plurality of audiences when the judgment system has judged the person who is talking is talking to the certain audience or some certain audiences of the plurality of audiences, such that the certain audience or some certain audiences of the plurality of audiences is/are aware that the person who is talking is talking to him or them.

According to an embodiment of the present invention, the method of performing a remote conference further comprises: determining, by means of a voice tracking system, which person from the persons in the first conference location is talking, before the judgment of whether the person who is talking is directed to the certain audience or some certain audiences of the plurality of audiences or is directed to all the audiences.

According to an embodiment of the present invention, the method of performing a remote conference further comprises: displaying, by means of the second image-displaying system, common images to all the audiences when the judgment system had judged that the person who is talking is directed to all the audiences.

According to an embodiment of the present invention, the method of performing a remote conference further comprises: displaying, by means of the second image-displaying system, common images to the rest of the audiences while displaying the special images to the certain audience or some certain audiences of the plurality of audiences.

According to an embodiment of the present invention, in addition to the person who is talking to the certain audience or some certain audiences of the plurality of audiences, other person(s) is/are further included in the first conference location, and the special images only include images of the person who is talking to the certain audience or some certain audiences of the plurality of audiences or only include images of face of the person who is talking to the certain audience or some certain audiences of the plurality of audiences.

According to an embodiment of the present invention, in addition to the person who is talking to the certain audience or some certain audiences of the plurality of audiences, other person(s) is/are further included in the first conference location, and the special images only include images of the person who is talking to the certain audience or some certain audiences of the plurality of audiences or only include images of face of the person who is talking to the certain audience or some certain audiences of the plurality of audiences while the common images include the images of the person who is talking and at least one of other person(s), or the images of faces of the person who is talking and at least one of other person(s).

According to an embodiment of the present invention, in addition to the images of the person who is talking to the certain audience or some certain audiences of the plurality of audiences, the common images include more images of scene than the special images.

With the abovementioned technical solution, for example, in the situation where the first conference location contains one person or a plurality of persons, sizes of the images of scene in these images are changed such that the audience(s) may know whether the talking is directed to him or them or not.

According to an embodiment of the present invention, the images of the person who is talking to the certain audience or some of the plurality of audiences have a larger size in the special images than in the common images.

According to an embodiment of the present invention, the images of the face of the person who is talking to the certain audience or some certain audiences of the plurality of audiences have a larger size in the special images than in the common images.

The detection system is an eyeball tracking system, which is configured to detect motions of eyeballs of persons in the first conference location, and the judgment system judges whether the person who is talking is talking to the certain audience or some certain audiences of the plurality of audiences, or is talking to all the audiences, based on the motions of eyeballs detected by the eyeball tracking system.

DETAILED DESCRIPTION OF THE EMBODIMENTS

Embodiments of the present invention are described in detail in conjunction with the description and the attached drawings.

Embodiments of the present invention are described in detail by reference to the attached drawings. In addition, for easy interpretation, lots of details are described in the following detailed description to provide comprehensive understanding on the embodiments of the present invention. However, it is obvious that one or more embodiments can be implemented without the above details. In other situations, known structures and devices are illustrated in the manner of diagram in order to simplify the drawings.

Figure 1:
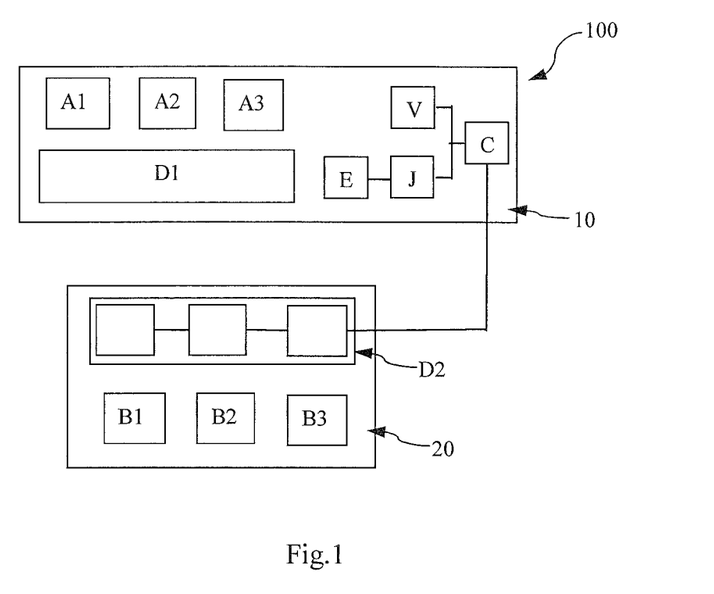
FIG. 1 is a schematic block view of a remote conference system according to an embodiment of the present invention.

As shown in FIG. 1, a remote conference system 100 according to an embodiment of the present invention includes a first image-displaying system D1 at a first conference location 10, configured to display images of a plurality of audiences B1, B2, B3; a detection system configured to detect motions or poses of at least part of heads of persons A1, A2, A3 in the first conference location 10; a judgment system J configured to judge whether the person (e.g., a person or a plurality of persons A1, A2, A3 in the first conference location 10) who is talking is talking to a certain audience or some certain audiences of the plurality of audiences B1, B2, B3 or to all the audiences B1, B2, B3, based on the motions or poses detected by the detection system; a second image-displaying system D2, at a second conference location 20, configured to display special images to the certain audience or some certain audiences of the plurality of audiences B1, B2, B3 when the judgment system J has judged that the person who is talking is talking to the certain audience or some certain audiences of the plurality of audiences B1, B2, B3, such that the certain audience or some of the plurality of audiences B1, B2, B3 is/are aware that the person who is talking is talking to him or them. Whereby, targeted audience(s) in the remote conference can know a person who is talking is talking to him or them.0

It is noted that the conference location used herein means that, for example, persons A1, A2, A3 in the same conference location may achieve direct intercommunion by eye contact, while persons in different conferences, such as A and B, cannot achieve direct intercommunion by eye contact. In other words, the intercommunion or conference between A and B in different conferences is remote conference or remote intercommunion. However, an interactive system of the present invention may provide an indirect manner such that A and B in different conferences may launch a remote conference, including achievement of an intercommunion by eye contact. In embodiments of the present invention below, terms of "conference" and "remote" have the same meanings as those in the above embodiments.

The remote conference system according to the embodiment of the present invention further includes a voice tracking system V, at the first conference location, configured to determine which person from the persons A1, A2, A3 in the first conference location is talking. In this instance, it is automatically determined which person is talking in the situation where a plurality of persons A1, A2, A3 are contained in the first conference location 10. In addition, the remote conference system according to the embodiment of the present invention further includes a controller or the like, configured to control operations of various components included in the remote conference system.

According to the embodiment of the present invention, the detection system may be an eyeball tracking system E configured to detect motions of eyeballs of persons A1, A2, A3 in the first conference location 10, and the judgment system J judges whether the person who is talking is talking to the certain audience or some certain audiences of the plurality of audiences, or is talking to all the audiences, based on the motions of the eyeballs detected by the eyeball tracking system. By this way, it can be determined much more exactly whether the person who is talking is talking to the certain audience or some certain audiences of the plurality of audiences, or is talking to all the audiences.

In addition, alternatively, it is possible to use a face orientation detection system to detect orientation of a face of the person who is talking or any other suitable system, and thus the judgment system J will judge whether the person who is talking is talking to a certain audience or some certain audiences of the plurality of audiences or is talking to all the audiences.

For example, as shown in FIG. 1, the voice tracking system V may automatically find location of a voice source, and thereby determine which person from the persons A1, A2, A3 in the first conference location 10 is talking. A camera system C may be provided at the first conference location 10 to take images based on the voice source location determined by the voice tracking system V. Specifically, when a plurality of persons A1, A2, A3 are talking, or making a speech by a microphone, the voice tracking system V will detect that, and then the camera system C will capture images. The voice tracking system V may be a voice addressing system. The eyeball tracking system E may capture motions of eyeballs of a person by a specific-designed optical probe, and the judgment system J may judge whether the person who is talking is talking to a certain audience or some certain audiences of the plurality of audiences B1, B2, B3 or is talking to all the audiences based on the motions of the eyeballs detected by the eyeball tracking system E. For example, the eyeball tracking system E may be provided with an optical probe to capture motions of the eyeballs of a person. In addition, the remote conference system 100 may further include a camera system provided at the second conference location 20 and configured to transfer the images of the plurality of audiences B1, B2, B3 to the first image-displaying system D1 at the first conference location 10. In the situation where the persons A1, A2, A3 in the conference location 10 are talking to the audience B1, B2, B3 in the second conference location 20, similar to those in the first conference location 10, a voice tracking system V, an eyeball tracking system E and a camera system C may be provided in the second conference location 20.

As shown in FIG. 1, according to some embodiments of the present invention, the second image-displaying system D2 is further configured to display common images to all the audiences B1, B2, B3 when the judgment system J has judged that the person who is talking is talking to all the audiences. By this way, the audience(s) can know the person who is talking is not talking to him or them. According to some other embodiments of the present invention, the second image-displaying system D2 is further configured to display special images to the certain audience or some certain audiences of the plurality of audiences B1, B2, B3 while displaying common images to the rest of the audiences. In this instance, the rest audience(s) can know the person who is talking is not talk to him or them.

According to some embodiments of the present invention, in addition to the person who is talking to the certain audience or some certain audiences of the plurality of audiences B1, B2, B3, other persons are further included in the first conference location 10. The special images only include images of the person who is talking to the certain audience or some certain audiences of the plurality of audiences B1, B2, B3, or only include images of face of the person who is talking to the certain audience or some certain audiences of the plurality of audiences. From this, in the situation where there are a plurality of persons in either of the two conference locations, images including the person who is talking may be provided to the certain audience or some certain audiences such that he or they know the person who is talking is talking to him or them.

According to some other embodiments of the present invention, in addition to the person who is talking to the certain audience or some certain audiences of the plurality of audiences B1, B2, B3, the first conference location 10 further includes other persons. The special images only include images of the person who is talking to the certain audience or some certain audiences of the plurality of audiences B1, B2, B3 or only include images of face of the person who is talking to the certain audience or some certain audiences of the plurality of audiences, while the common images include images of the person who is talking and at least one of the other persons or images of faces of the person who is talking and at least one of the other persons. In the situation where the two conference locations both include a plurality of persons, only images including the person who is talking or images including all the persons in the first conference location are provided to the audiences, such that the audience(s) know whether the person who is talking is talking to him or them.

In an embodiment relating to the special images and the common images, in addition to the images including the person who is talking to the certain audience or some certain audiences of the plurality of audiences B1, B2, B3, the common images are images including more scenes relative to the special images. From this, when the first conference location includes one person or a plurality of persons, sizes of the images of the scene in these images may be changed such that the audience(s) know whether the talking is directed to him or them.

As another embodiment relating to the special images and the common images, size of the images of the person who is talking to the certain audience or some certain audiences of the plurality of audiences B1, B2, B3 is larger in the special images than in the common images. From this, in the situation where the first conference location includes one person or a plurality of person, the size of the images of the person who is talking in the images may be changed such that the audience(s) knows whether the talking aims to him or them. As a still another embodiment relating to the special images and the common images, the size of the images of face of the person who is talking to the certain audience or some certain audiences of the plurality of audiences B1, B2, B3 in the special images is larger than size of that in the common images. From this, in the situation where the first conference location includes one person or a plurality of person, the size of the images of the face of the person who is talking in the images may be changed such that the audience(s) knows whether the talking aims to him or them.

For example, the voice tracking system V determines which person from the persons A1, A2, A3 in the first conference location 10 is talking. The judgment system J judges whether the person who is talking is talking to the certain audience or some certain audiences in the plurality of audiences B1, B2, B3, or is talking to all the audiences. According to result of the judgment from the judgment system J, the image-displaying system D2 of the conference system 100 provides difference images or identical images to the plurality of audiences B1, B2, B3. For example, the second image-displaying system D2 may be a multiple-viewing-field display system or may be a plurality of displays. By this way, the plurality of audiences B1, B2, B3 may be provided with different images, and thus a remote conference scene that is closer to the real situation can be provided, in accordance with different requirements.

For example, in the first conference location 10, as shown in FIG. 1, the voice tracking system V detects a person A2 is talking, and if eyes of the person A2 who is talking are on images of an audience B3 in the image-displaying system D1, the judgment system J judges that the person A2 who is talking and the audience B3 are performing an individual conversation and communication. The second image-displaying system D2 will display the special images to the audience B3. For example, a multiple-viewing-field display system may be used to display the special images to the audience B3 while the second image-displaying system D2 still provides common images, such as entire scene of the first conference location 10, to other audiences B1 and B2, that is, the common images provided by the second image-displaying system D2 to other audiences B1 and B2 are maintained. If the eyeball tracking system E detects the motions of eyes of the person A2 who is talking aims to no target, the judgment system J judges that the person A2 who is talking is talking to all the audiences B1, B2, B3 and thus the second image-displaying system D2 does not make special treatment or the second image-displaying system D2 provides images of all the persons A1, A2, A3 in the first conference location 10.

For example, in a video conference, the eyeball tracking system E may capture images in which the person A2 who is talking is gazing at the images of the audience B3 in the first image-displaying system D1 and the voice tracking system V may detect the voice from the person A2 who is talking, and thus the judgment system J may judge that the person A2 who is talking is talking to the audience B3 mostly. With the help of the camera system C, the images captured are transferred to the second image-displaying system D2, and the second image-displaying system D2 may display the special images to the audience B3, such as, the images of the single person A2 who is talking. Meanwhile, the second image-displaying system D2 displays the common images, such as, the video images of overall the first conference location 10 or the images of all persons A1, A2, A3 in the first conference location 10, to the rest audiences B1 and B2. In this instance, the directionality or targeted characteristic of the remote video conference may be improved, and communication block is avoided due to target indeterminacy between a speaker and a hearer.

As an another example, in a video conference, the eyeball tracking system E may detect that eyes of persons A1 and A2 are respectively on images of persons B1 and B2 in the first image-displaying system D1 by capturing motions of eyeballs of the persons A1, A2, A3, meanwhile, the voice tracking system V may detect voices from the persons A1 and A2, and thus the judgment system J may judge that the person A1 who is talking is talking to the audience B1 one to one and the person A2 who is talking is talking to the audience B3 one to one. The second image-displaying system D2 may display special images, such as images of the single person A1 who is talking, to the audience B1, and may display special images, such as images of the single person A2 who is talking, to the audience B3, while the second image-displaying system D2 may still display common images, such as the video images of overall the first conference location 10 or the images of all persons A1, A2, A3 in the first conference location 10, to the rest audience B2.

A method of performing a remote conference according to an embodiment of the present invention will be described as below.

Figure 2:
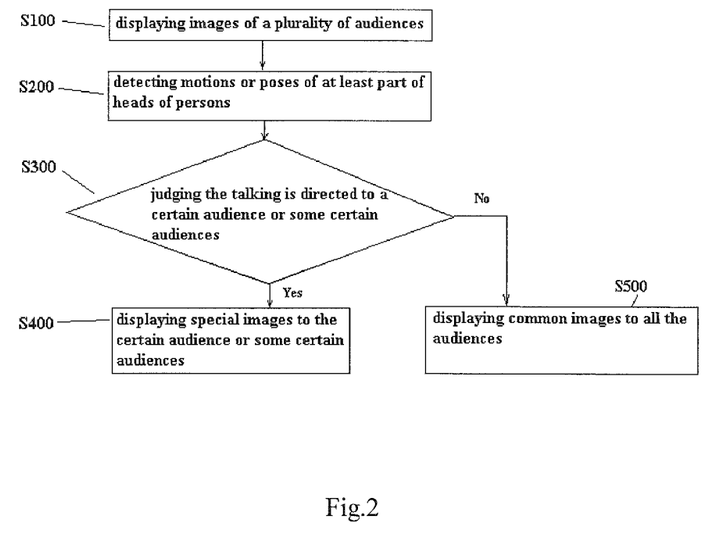
FIG. 2 is a flow chart of a method of performing a remote conference according to an embodiment of the present invention.

As shown in FIG. 2, the method of performing a remote conference according to an embodiment of the present invention includes:

step S100 of: displaying, by means of a first image-displaying system D1, images of a plurality of audiences B1, B2, B3 in a first conference location 10;

step S200 of: detecting, by means of a detection system, motions or poses of at least part of heads of persons A1, A2, A3 in the first conference location 10;

step S300 of: judging, by means of a judgment system J, whether a person who is talking is talking to a certain audience or some certain audiences of the plurality of audiences B1, B2, B3 or to all the audiences based on the motions or poses detected by the detection system;

step S400 of: displaying, by means of a second image-displaying system D2 at a second conference location 20, special images to the certain audience or some certain audiences of the plurality of audiences B1, B2, B3 when the judgment system J has judged the person who is talking is talking is to the certain audience or some certain audiences of the plurality of audiences, such that the certain audience or some certain audiences of the plurality of audiences B1, B2, B3 is/are aware that the person who is talking is talking to him or them. By this way, targeted audience(s) in the remote conference can be aware that a person who is talking is talking to him or them.

Referring to FIG. 2, the method of performing a remote conference further includes:

step S500 of: displaying, by means of the second image-displaying system D2, common images to all the audiences when the judgment system J has judged that the person who is talking is talking to all the audiences. By this way, the audiences may know the talking is not directed to them.

According to some embodiments of the present invention, the method of performing a remote conference further includes:

before the judgment of whether the person who is talking is talking the certain audience or some certain audiences of the plurality of audiences or is talking to all the audiences, determining, by means of a voice tracking system, which person from the persons in the first conference location is talking. By this way, it is determined which person is talking in the situation where a plurality of persons are included in the first conference location.

According to an example of the present invention, the detection system may be an eyeball tracking system configured to detect motions of eyeballs of the persons in the first conference location. The judgment system judges whether the person who is talking is talking to the certain audience or some certain audiences of the plurality of audiences, or is talking to all the audiences, based on the motions of the eyeballs detected by the eyeball tracking system. By this way, it can be determined much more exactly whether the person who is talking is talking to the certain audience or some certain audiences of the plurality of audiences, or is talking to all the audiences.

According to some embodiments of the present invention, the method of performing a remote conference further includes: displaying, by means of the second image-displaying system D2, the common images to the rest of the audiences while displaying the special images to the certain audience or some certain audiences of the plurality of audiences B1, B2, B3. In this instance, the rest audiences may know the talking does not aim to them.

According to some embodiments of the present invention, in addition to the person who is talking to the certain audience or some certain audiences of the plurality of audiences B1, B2, B3, other persons are further included in the first conference location 10. The special images only include images of the person who is talking to the certain audience or some certain audiences of the plurality of audiences B1, B2, B3, or only include images of face of the person who is talking to the certain audience or some certain audiences of the plurality of audiences. From this, in the situation where a plurality of persons are included in either of the two conference locations, the images including the person who is talking may be provided to the certain audience or some certain audiences such that he or they know the person who is talking is talking to him or them.

According to some embodiments of the present invention, in addition to the person who is talking to the certain audience or some certain audiences of the plurality of audiences B1, B2, B3, the first conference location 10 further includes other persons. The special images only include images of the person who is talking to the certain audience or some certain audiences of the plurality of audiences B1, B2, B3 or only include images of face of the person who is talking to the certain audience or some certain audiences of the plurality of audiences, while the common images include images of the person who is talking and at least one of the other persons or images of faces of the person who is talking and at least one of the other persons. In the situation where a plurality of persons are included in either of the two conference locations, the images including the person who is talking or the images including all persons in the first conference location are provided to the audiences, such that the audience(s) know whether the person who is talking is talking to him or them.

As an embodiment relating to the special images and the common images, in addition to the images including the person who is talking to the certain audience or some certain audiences of the plurality of audiences B1, B2, B3, the common images include more images of scene than the special images. By this way, in the situation where the first conference location contains one person or a plurality of persons, the size of the images of the scene in the images may be changed such that the audience(s) may know whether the talking is directed to him or them.

As another embodiment relating to the special images and the common images, the images of the person who is talking to the certain audience or some certain audiences of the plurality of audiences B1, B2, B3 have larger size in the special images than in the common images. By this way, when the first conference location includes one or more persons, the size of the images of the person who is talking in the images is changed such that the audience(s) may know whether the talking is directed to him or them.

As a still another embodiment relating to the special images and the common images, the images of face of the person who is talking to the certain audience or some certain audiences of the plurality of audiences B1, B2, B3 have larger size in the special images than in the common images. By this way, when the first conference location includes one or more persons, the size of the images of the face of the person who is talking in the images is changed such that audience(s) may know whether the talking is directed to him or them.

In addition, the person in the first conference location may be interpreted as one person or a plurality of persons.

The above embodiments are introduced to describe the present invention, rather than limit the present invention. Various modifications and variants may be made by those skilled in the art without departing from inspirit and scope of the present invention, and thus the equivalents of the technical solution of the present invention are fallen into the scope of the present invention. The scope of the present invention should be defined by the pending claims.

What is claimed is:

1. A remote conference system, comprising:
a first image-displaying system, at a first conference location, configured to display images of a plurality of audiences;
a detection system configured to detect motions or poses of at least part of heads of persons in the first conference location;
a judgment system configured to judge whether a person who is talking is talking to a certain audience or some certain audiences of the plurality of audiences or is talking to all the audiences based on the motions or poses detected by the detection system;
a second image-displaying system, at a second conference location, configured to display special images to the certain audience or some certain audiences of the plurality of audiences when the judgment system has judged that the person who is talking is talking to the certain audience or some certain audiences of the plurality of audiences, such that the certain audience or some certain audiences of the plurality of audiences is/are aware that the person who is talking is talking to him or them.

2. The remote conference system according to claim 1, further comprising:
a voice tracking system, at the first conference location, configured to determine which person from the persons in the first conference location is talking.

3. The remote conference system according to claim 2, wherein:
in addition to the person who is talking to the certain audience or some certain audiences of the plurality of audiences, other person(s) is/are further included in the first conference location, and the special images only include images of the person who is talking to the certain audience or some certain audiences of the plurality of audiences or only include images of face of the person who is talking to the certain audience or some certain audiences of the plurality of audiences.

4. The remote conference system according to claim 1, wherein:
the second image-displaying system is further configured to display common images to all the audiences when the judgment system had judged that the person who is talking is talking to all the audiences, or is further configured to display the common images to the rest of the audiences while displaying the special images to the certain audience or some certain audiences of the plurality of audiences.

5. The remote conference system according to claim 4, wherein:
in addition to the person who is talking to the certain audience or some certain audiences of the plurality of audiences, other person(s) is/are further included in the first conference location, and the special images only include images of the person who is talking to the certain audience or some certain audiences of the plurality of audiences or only include images of face of the person who is talking to the certain audience or some certain audiences of the plurality of audiences, while the common images include the images of the person who is talking and at least one of the other person(s), or the images of faces of the person who is talking and at least one of the other person(s).

6. The remote conference system according to claim 4, wherein:
in addition to the images of the person who is talking to the certain audience or some certain audiences of the plurality of audiences, the common images include more images of scene than the special images.

7. The remote conference system according to claim 4, wherein:
the images of the person who is talking to the certain audience or some certain audiences of the plurality of audiences have a larger size in the special images than in the common images.

8. The remote conference system according to claim 4, wherein:
the images of the face of the person who is talking to the certain audience or some certain audiences of the plurality of audiences have a larger size in the special images than in the common images.

9. The remote conference system according to claim 4, wherein:
in addition to the person who is talking to the certain audience or some certain audiences of the plurality of audiences, other person(s) is/are further included in the first conference location, and the special images only include images of the person who is talking to the certain audience or some certain audiences of the plurality of audiences or only include images of face of the person who is talking to the certain audience or some certain audiences of the plurality of audiences.

10. The remote conference system according to claim 1, wherein:
in addition to the person who is talking to the certain audience or some certain audiences of the plurality of audiences, other person(s) is/are further included in the first conference location, and the special images only include images of the person who is talking to the certain audience or some certain audiences of the plurality of audiences or only include images of face of the person who is talking to the certain audience or some certain audiences of the plurality of audiences.

11. The remote conference system according to claim 1, wherein:
the detection system is an eyeball tracking system configured to detect motions of eyeballs of persons in the first conference location, and the judgment system judges whether the person who is talking is talking to the certain audience or some certain audiences of the plurality of audiences, or is talking to all the audiences, based on the motions of eyeballs detected by the eyeball tracking system.

12. A method of performing a remote conference, comprising:
displaying, by means of a first image-displaying system, images of a plurality of audiences in a first conference location;
detecting, by means of a detection system, motions or poses of at least part of heads of persons in the first conference location;
judging, by means of a judgment system, whether a person who is talking is directed to a certain audience or some certain audiences of the plurality of audiences or is directed to all the audiences based on the motions or poses detected by the detection system;
displaying, by means of a second image-displaying system at a second conference location, special images to the certain audience or some certain audiences of the plurality of audiences when the judgment system has judged the person who is talking is talking to the certain audience or some certain audiences of the plurality of audiences, such that the certain audience or some certain audiences of the plurality of audiences is/are aware that the person who is talking is talking to him or them.

13. The method according to claim 12, further comprising:
determining, by means of a voice tracking system, which person from the persons in the first conference location is talking, before the judgment of whether the person who is talking is directed to the certain audience or some certain audiences of the plurality of audiences or is directed to all the audiences.

14. The method according to claim 12, further comprising:
displaying, by means of the second image-displaying system, common images to all the audiences when the judgment system had judged that the person who is talking is talking to all the audiences, or
displaying, by means of the second image-displaying system, common images to the rest of the audiences while displaying the special images to the certain audience or some certain audiences of the plurality of audiences.

15. The method according to claim 14, wherein:
in addition to the person who is talking to the certain audience or some certain audiences of the plurality of audiences, other person(s) is/are further included in the first conference location, and the special images only include images of the person who is talking to the certain audience or some certain audiences of the plurality of audiences or only include images of face of the person who is talking to the certain audience or some certain audiences of the plurality of audiences while the common images include images of the person who is talking and at least one of other person(s), or images of faces of the person who is talking and at least one of other person(s).

16. The method according to claim 14, wherein:
in addition to the images of the person who is talking to the certain audience or some certain audiences of the plurality of audiences, the common images include more images of scene than the special images.

17. The method according to claim 14, wherein:
the images of the person who is talking to the certain audience or some certain audiences of the plurality of audiences have a larger size in the special images than in the common images.

18. The method according to claim 14, wherein:
the images of the face of the person who is talking to the certain audience or some certain audiences of the plurality of audiences have a larger size in the special images than in the common images.

19. The method according to claim 12, wherein:
in addition to the person who is talking to the certain audience or some certain audiences of the plurality of audiences, other person(s) is/are further included in the first conference location, and the special images only include images of the person who is talking to the certain audience or some certain audiences of the plurality of audiences or only include images of face of the person who is talking to the certain audience or some certain audiences of the plurality of audiences.

20. The method according to claim 12, wherein:
the detection system is an eyeball tracking system, which is configured to detect motions of eyeballs of persons in the first conference location, and the judgment system judges whether the person who is talking is talking to the certain audience or some certain audiences of the plurality of audiences, or is talking to all the audiences, based on the motions of eyeballs detected by the eyeball tracking system.

* * * * *